(12) United States Patent
Savicki, Jr. et al.

(10) Patent No.: US 7,758,234 B1
(45) Date of Patent: Jul. 20, 2010

(54) ELECTRICAL LIGHTING DEVICE

(75) Inventors: Gerald R. Savicki, Jr., Canastota, NY (US); Jeffrey C. Richards, Baldwinsville, NY (US); David A. Finlay, Sr., Marietta, NY (US); Gary Wilson, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 1167 days.

(21) Appl. No.: 11/294,167

(22) Filed: Dec. 5, 2005

Related U.S. Application Data

(63) Continuation-in-part of application No. 11/242,406, filed on Oct. 3, 2005, now Pat. No. 7,285,721.

(51) Int. Cl.
*H01R 33/00* (2006.01)

(52) U.S. Cl. ........................... 362/641; 362/642

(58) Field of Classification Search .............. 362/100, 362/641, 642, 646, 240, 244, 245, 246, 251, 362/271, 276, 311, 326, 327, 328, 329, 347, 362/364, 802, 800, 394
See application file for complete search history.

(56) References Cited

U.S. PATENT DOCUMENTS

| | | | | |
|---|---|---|---|---|
| 2,839,670 | A * | 6/1958 | Gladstone | 362/605 |
| 4,028,613 | A * | 6/1977 | Stiller et al. | 323/300 |
| 4,343,032 | A * | 8/1982 | Schwartz | 362/276 |
| 5,038,079 | A * | 8/1991 | Szuba | 315/158 |
| 5,039,914 | A * | 8/1991 | Szuba | 315/158 |
| 5,118,992 | A * | 6/1992 | Szuba | 315/158 |
| 5,307,051 | A * | 4/1994 | Sedlmayr | 340/573.1 |
| 5,473,517 | A * | 12/1995 | Blackman | 362/95 |
| 5,544,025 | A * | 8/1996 | Bohlool et al. | 362/95 |
| 6,010,228 | A * | 1/2000 | Blackman et al. | 362/95 |
| 6,122,678 | A * | 9/2000 | Eckel et al. | 710/15 |
| 6,199,310 | B1 * | 3/2001 | Mueller et al. | 40/564 |
| 6,386,725 | B1 | 5/2002 | Amburgey | |
| 6,390,647 | B1 * | 5/2002 | Shaefer | 362/276 |
| 6,555,966 | B2 * | 4/2003 | Pitigoi-Aron | 315/158 |
| 6,776,505 | B1 * | 8/2004 | DeWitt | 362/249 |
| 6,805,469 | B1 | 10/2004 | Barton | |
| 6,808,283 | B2 * | 10/2004 | Tsao | 362/95 |
| 6,883,927 | B2 * | 4/2005 | Cunningham et al. | 362/95 |
| 6,905,231 | B2 * | 6/2005 | Dickie | 362/271 |

(Continued)

*Primary Examiner*—Hargobind S Sawhney
(74) *Attorney, Agent, or Firm*—Daniel P. Malley; Bond, Schoeneck & King, PLLC

(57) ABSTRACT

The present invention is directed to a light emitting wiring device for selectively illuminating a space. The device includes a housing including a plurality of wiring terminals configured to be connected to a source of electrical power. A circuit is disposed in the housing. The circuit is configured to provide an output signal in response to at least one external input signal. The device also includes an emission-detection assembly includes a lamp sub-assembly coupled to the at least one circuit. The lamp sub-assembly includes at least one light emitting element configured to emit light in response to the output signal. An ambient light sensor sub-assembly is coupled to the at least one circuit and includes an ambient light sensor and a sensor housing assembly. The ambient light sensor is configured to generate the at least one external input signal in response to an ambient light level in the space. The sensor housing assembly is configured to substantially isolate the ambient light sensor from the light emitted into the space.

52 Claims, 8 Drawing Sheets

U.S. PATENT DOCUMENTS

| | | | |
|---|---|---|---|
| 7,011,420 B2 * | 3/2006 | Cok | 362/84 |
| 7,118,235 B2 | 10/2006 | Barton | |
| 7,506,990 B2 | 3/2009 | Glazner | |
| 2002/0131262 A1 * | 9/2002 | Amburgey | 362/95 |
| 2006/0007709 A1 * | 1/2006 | Yuen | 362/641 |

* cited by examiner

ELECTRICAL LIGHTING DEVICE

CROSS-REFERENCE TO RELATED APPLICATIONS

This is a continuation-in-part of U.S. patent application Ser. No. 11/242,406 filed on Oct. 3, 2005, now U.S. Pat. No. 7,285,721 the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical devices, and particularly to electrical lighting devices suitable for commercial and residential applications.

2. Technical Background

The typical layout of a room, whether it is a public space, a living space or a commercial space, provides a wall light switch disposed adjacent to the point of entry. In a scenario that most people are familiar with, a person crossing the threshold of a darkened room will usually attempt to locate the wall switch and turn the wall switch to the ON position before entering. Sometimes the wall switch is not located in this position and the person seeking access to the room must search for the light switch. The person searching for the wall switch is required to navigate around objects such as tables and chairs. Usually, a person entering the room attempts to "feel" their way around the room. If an object is disposed relatively low to the floor surface the person may trip over it and suffer an injury. Accordingly, searching a room in this manner is not recommended because of the aforementioned safety issues. The scenario recounted above is also applicable to (but not limited to) other types of spaces such as corridors, theater aisles, stairways, patios, garages, ingress/egress areas, out-buildings, outdoor pathways and the like.

As noted above, there are situations where a light switch is not available, or is not readily available. There are other situations where the person entering the darkened room is disinclined to turn the lights ON as a matter of courtesy. Several examples immediately come to mind. A person entering a darkened theatre would expect to incur the wrath of his fellow patrons if he turned the theatre lights ON while finding a seat. In another situation, a person may desire to temporarily enter a room occupied by a person who is sleeping. For example, a parent may not want to check on the condition of a sleeping infant, or tend to someone who is ill, without having to turn the lights ON and so disturb their sleep.

In one approach that has been considered, a portable lighting device may be inserted into an electrical receptacle located in the room and function as a temporary lighting device. While this arrangement may provide adequate illumination and temporarily mitigate a potentially unsafe condition, it has certain drawbacks associated with it. Temporary lighting devices are usually aesthetically unappealing and have a makeshift look and feel. On the other hand, a temporary lighting device may be plugged into the receptacle for an extended period of time to meet the recurring lighting need. The user may attempt to address this problem by unplugging the temporary lighting device during daylight hours if the space admits natural light. However, once the temporary lighting device is unplugged from the receptacle there is the possibility that it will become lost, misplaced, or damaged from excessive handling. Of course, the steps of inserting and removing the device in response to the daily cycle is not a solution in internal spaces lacking access to sunlight.

In another approach that has been considered, a light element may be disposed in a wiring device in combination with another functional element such as a receptacle or a light switch. The wiring device is subsequently installed in a wall box or mounted to a panel. While this approach obviates some of the drawbacks described above, there are other drawbacks that come into play. Conventional permanent lighting elements such as incandescent and neon lights have a relatively short life expectancy of only a few years and, therefore, require periodic servicing and/or replacement. This problem is exacerbated by the fact that the light is typically hard-wired to power contacts disposed in the wiring device. As such, the light element is permanently ON, further limiting the light elements life expectancy.

In yet another approach that has been considered, the aforementioned drawbacks are addressed by providing a light sensor, and the associated circuitry, to control the light element. When the sensor detects the ambient light level falling past a certain point, the control circuit turns the light element ON. One design problem associated with using a light sensor to selectively actuate the light element relates to providing a proper degree of isolation between the light sensor and the light element. Conventional devices solve the problem by separating the light sensor and the light element by as great a distance as possible. As such, conventional devices are typically arranged such that the lens covering the light element is disposed in one portion of the wiring device cover and the sensor element is disposed in a second portion of the cover, with sufficient space therebetween. If the wiring device includes another functional element such as a receptacle, the sensor may be disposed between the receptacle and the light's lens cover. Because the light sensor must be disposed a sufficient distance away from the light element, it necessarily requires that the lighting assembly be reduced in size to fit the wiring device form factor. Accordingly, conventional devices of this type often fail to provide an adequate amount of illumination for the intended application and, therefore, do not address the safety concern in a satisfactory manner.

What is needed is a light source that is both adapted to a wiring device form factor and configured to address the drawbacks and needs described above. In particular, a light emitting wiring device is needed that provides a sufficient amount of illumination when the ambient light in a given space falls below a safe level. The wiring device must maximize the effective area of illumination without sacrificing sensor isolation. Further, the light source elements must have a sufficient life expectancy, i.e., greater than ten years.

SUMMARY OF THE INVENTION

The present invention addresses the needs described above by providing a light source that is both adapted to various wiring device form factors and configured to address the drawbacks and needs described above. The light emitting wiring device of the present invention provides a high degree of illumination when the ambient light in a given space falls below a safe level by maximizing the effective area of illumination without sacrificing sensor isolation. For example, in one embodiment of the present invention, the light emitting wiring device includes an effective area of illumination that encompasses substantially all of the area provided by a standard sized wall plate, such as wall plate openings having the dimensional characteristics provided by the standard WD6 opening as defined in the ANSI/NEMA standards. Further, the light source elements employed in the present invention have a typical life expectancy that is greater than ten years.

One aspect of the present invention is directed to a light emitting wiring device for selectively illuminating a space. The device includes a housing including a plurality of wiring terminals configured to be connected to a source of electrical power. A circuit is disposed in the housing. The circuit is configured to provide an output signal in response to at least one external input signal. The device also includes an emission-detection assembly includes a lamp sub-assembly coupled to the at least one circuit. The lamp sub-assembly includes at least one light emitting element configured to emit light in response to the output signal. An ambient light sensor sub-assembly is coupled to the at least one circuit and includes an ambient light sensor and a sensor housing assembly. The ambient light sensor is configured to generate the at least one external input signal in response to an ambient light level in the space. The sensor housing assembly is configured to substantially isolate the ambient light sensor from the light emitted into the space.

In another aspect, the present invention includes light emitting wiring device for selectively illuminating a space. The device includes a housing including a plurality of wiring terminals configured to be connected to a source of electrical power. At least one circuit is disposed in the housing. The at least one circuit is configured to provide an output signal in response to at least one external input signal. An emission-detection assembly includes a lamp sub-assembly coupled to the at least one circuit. The lamp sub-assembly includes at least one light emitting element configured to emit light in response to the output signal. An ambient light sensor sub-assembly is coupled to the at least one circuit and includes an ambient light sensor and a sensor housing assembly. The ambient light sensor is configured to generate the at least one external input signal in response to an ambient light level in the space. The sensor housing assembly is configured to substantially isolate the ambient light sensor from the light emitted into the space. A lens cover is coupled to the housing. The lens cover includes a major surface shape and size corresponding to a shape and size of a standard wall plate opening. The major surface includes a lens array disposed therein. The lens array is configured to direct the light emitted by the plurality of light emitting elements into the space.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
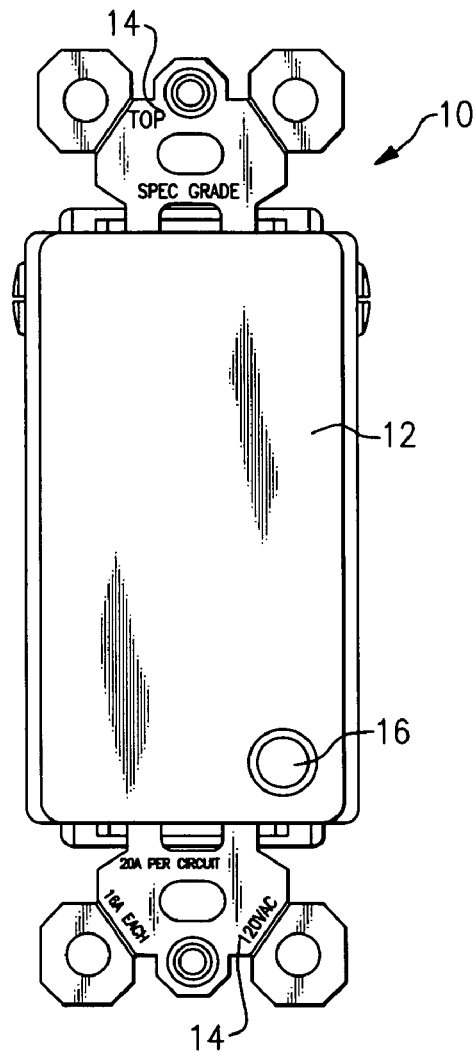
FIG. 1 is a front view of light emitting wiring device in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the light emitting wiring device of the present invention is shown in FIG. 1, and is designated generally throughout by reference numeral 10.

As embodied herein, and depicted in FIG. 1, a front view of light emitting wiring device 10 is shown. Device 10 includes an illumination lens 12 disposed over substantially all of the surface area that is accessible to a user after installation. The illumination lens 12 may be transparent, translucent and/or apertured. A lamp assembly is disposed behind illumination lens 12. The lens 12 is configured to direct the light that is emitted by the lamp assembly into the space that requires illumination. The illumination lens 12 may be designed to diffuse the light emitted from the lamp, or direct the light such into a predetermined region of space.

Device 10 includes mounting tabs 14 that are used to affix the device to an outlet box, panel, wall, or some other structural element. After the light emitting wiring device 10 is installed, a cover plate (not shown) is attached to either the device, an outlet box, or a panel, depending on the arrangement. The light emitting wiring device shown in FIG. 1 includes an effective area of illumination, i.e., the surface area of lens 12, that encompasses substantially all of the area provided by a standard sized wall plate opening. See, for example, wall plate openings having the dimensional characteristics provided by the opening defined by the ANSI/NEMA WD6 standard. Those of ordinary skill in the art will understand that wall plates conforming to the aforementioned standard are ubiquitously employed. On the other hand, a multi-gang cover plate that accommodates device 10 and one or more additional wiring devices disposed in a multi-gang box may also be employed.

As shown in FIG. 1, an aperture configured to accommodate an ambient light sensor lens 16 may be disposed in lens 12. As noted above, one of the problems associated with using a light sensor to selectively actuate a light element in a wiring device relates to providing a proper degree of isolation between the light sensor and the light element. In conventional devices the requisite isolation is achieved by providing a physical separation between the lens and the sensor. As noted, this limits the surface area of the lens. The present invention overcomes this limitation. Accordingly, an ambient light sensor assembly is configured to receive ambient light via the sensor lens 16 disposed in a portion of lamp lens 12. Of course, the lamp is controlled by the light sensor which activates the lamp in response to a predetermined ambient light luminosity. When the luminosity is below a predetermined threshold, the lamp assembly is energized and light is emitted.

Those of ordinary skill in the art will understand that ambient light sensor lens 16 may be implemented as an integral part of lens 12. In yet another embodiment, sensor lens 16 may be disposed within an opening of the cover plate and/or lens 12.

Figure 2:
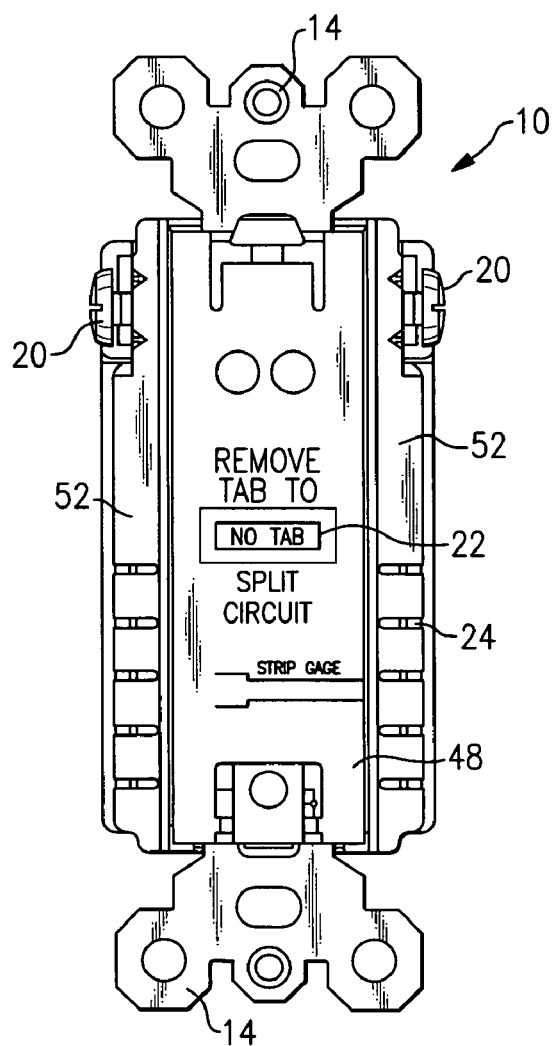
FIG. 2 is a rear view of the light emitting wiring device depicted in FIG. 1.

Referring to FIG. 2, a rear view of the light emitting wiring device 10 is shown. Device 10 may be connected to a source of electrical power by way of terminals 20. Terminals 20 may be implemented using screw terminals, wire lead terminals, push-wire terminals, back-wire terminals, composite terminals, or any suitable means. For residential, commercial and institutional applications, electrical distribution systems are commonly rated about 120 VAC or 240 VAC. Wiring device 10 may include one or more electrical circuits configured to operate at either 120 VAC, 240 VAC, or both. This feature is implemented by way of tab element 22, which is used to configure device 10 for operability at either 120 VAC or 240 VAC. When tab element 22 is inserted, the circuits disposed in device 10 are coupled. When tab element 22 is removed, the circuits operate independently. Reference is made to co-pending U.S. patent application Ser. No. 10/729,566, filed Dec. 5, 2003, which is incorporated herein by reference as though fully set forth in its entirety, for a more detailed explanation of tab element 22.

The rear portion of device 10 also includes a plurality of vents 24. The vents 24 allow the heat generated by the lamp assembly and the circuitry to escape device 10 and dissipate in a safe manner.

Figure 3:
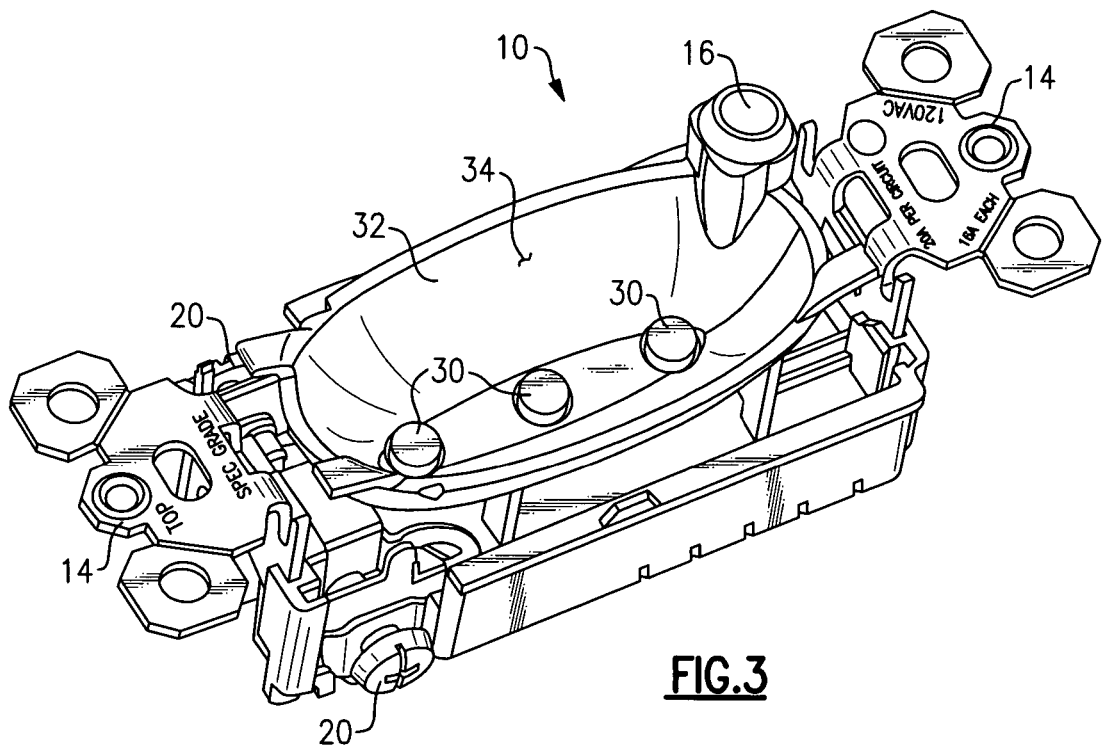
FIG. 3 is a perspective view of the light emitting wiring device depicted in FIG. 1.

Referring to FIG. 3, a perspective view of the light emitting wiring device 10 is shown with the illumination lens 12 removed. Lamp elements 30 are disposed behind illumination lens 12 and inside of reflector element 32. Sensor assembly 60 is disposed along an edge portion of the reflector element 32. In one embodiment, at least a portion of sensor assembly 60 is integrally formed as a part of the reflector element 32. Sensor assembly 60 includes a sensor 62 (not shown in FIG. 3) physically coupled to a printed circuit board disposed under the reflective element 32 by elongated structure 66. A sensor aperture is formed in elongated structure 66. The sensor aperture is formed to accommodate sensor lens 16. Sensor assembly 60 will be described in more detail in the discussion of FIG. 5.

It will be apparent to those of ordinary skill in the pertinent art that modifications and variations can be made to reflector element 32 of the present invention depending on the shape and material used in fabricating the element. Reflector 32 includes a base member that accommodates lamp elements 30. Surrounding the base member is a reflective hood. For example, the reflective hood may be optically configured to provide a predetermined light distribution. In one embodiment, the reflective hood may be a parabolic design having the lamps disposed at a focal point of the reflector. The reflective hood may also be configured as a modified parabolic design, a concave shape, or in the "bath tub" shaped configuration shown in FIG. 3.

Those of ordinary skill in the art will also understand that reflector 32 may be formed from any suitable material such as plastic or metallic materials. Reflector 32 is furnished with a reflective surface 34 that directs light emitted by the lamps 30 into the illuminated space. If the reflector 32 is formed from a metallic material such as aluminum, surface 34 is simply the material itself, i.e., polished aluminum. On the other hand, if the reflector 32 is formed from a plastic material, surface 34 may be formed by depositing a suitable reflective finish thereon. In one embodiment, a reflective surface may be painted on reflector element 32. However, any suitable finish may be applied to the reflector element using any suitable application technique.

Figure 4A:
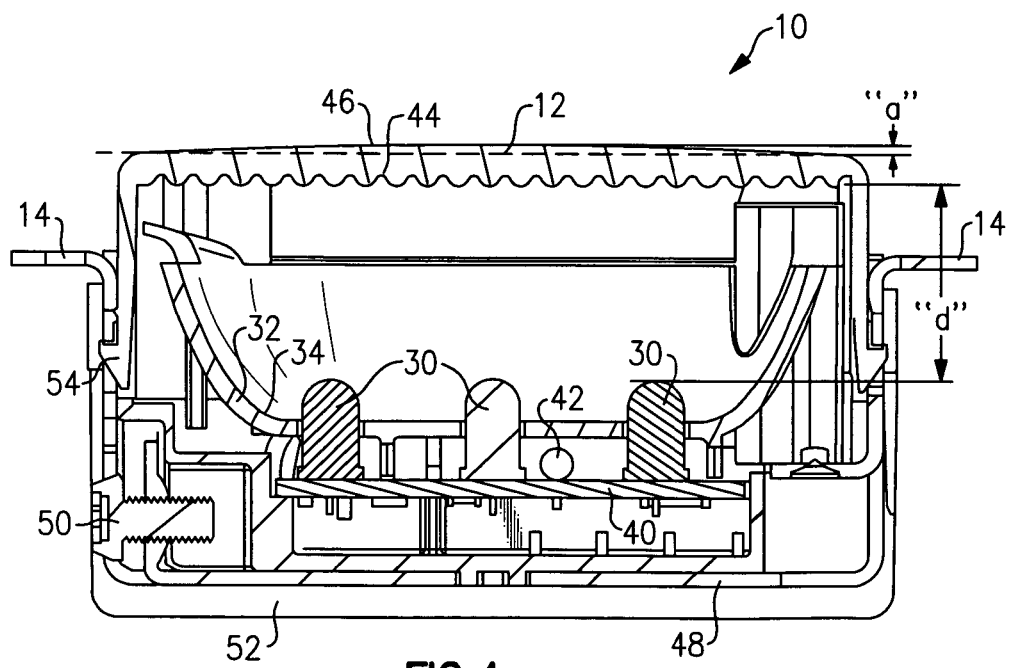
FIG. 4A is a longitudinal cross-sectional view of the light emitting wiring device shown in FIG. 1.

FIG. 4A provides a longitudinal cross-sectional view of the light emitting wiring device 10 shown in FIG. 1. The arrangement of reflector element 32, lamp elements 30, and lens cover 12 provides a geometrical relationship causing substantially uniform light to be emitted from lens 12. Illumination lens 12 includes a substantially smooth outer surface 46 that is easily cleaned by the user. The inner surface 44 includes an array of convex lenses. As shown, the lens array covers substantially all of the effective surface illumination area of device 10. The individual lenslets that comprise lens 12 may be convex lens elements. In another embodiment, the lens elements may be of a parabolic, pyramidal, or polygonal shape geometry. Those of ordinary skill in the art will also understand that lens array 12 may be of any suitable type and be configured as a fresnel lens array or as a lenticular lens array, depending on the desired illumination pattern. The inventors have found that the uniformity of the illumination beam becomes acceptable when the lens density of lens array 12 is at least 9×9 lenslets per square inch, i.e., 81 lenslets per square inch. Of course, the greater the density of lenslets the more uniform the illumination beam becomes.

The longitudinal cross-sectional profile of outer surface 46 may be arcuate such that a center portion of outer surface 46 extends a vertical distance "a" from the edge of lens 12. In another embodiment, both the longitudinal cross-sectional profile and the transverse cross-sectional profile are arcuate. Those of ordinary skill in the art will appreciate that as the degree of curvature increases in each direction, i.e., in the transverse and longitudinal directions, the illumination beam becomes relatively broader. In other words, when dimension "a" is zero, surface 46 is substantially planar and the individual light beams in the illumination pattern are substantially parallel to central lens axis "c". However, when the degree of curvature increases in a given direction, the individual light beams diverge from central axis "c" and the cross-sectional beam coverage area increases accordingly. Of course, the present invention contemplates variations in the cross-sectional area of the beam in accordance with the application.

It will be apparent to those of ordinary skill in the pertinent art that modifications and variations can be made to lamp elements 30 of the present invention depending on the illumination properties and the life expectancy of the individual lamp elements. For example, the lamp elements shown in FIGS. 1-4 are LED elements that have a typical life expectancy of at least ten years. Those skilled in the art will understand that similar light sources may be employed accordingly.

Lamps 30 are chosen to have a viewing angle of at least about 40 to 80 degrees (light output diminishes considerably outside of the viewing angle.) Through experimentation it has been discovered that the distance "d" between lamps 30 and the inside surface 44 of illumination lens 12 should be greater than about 0.5 inches for uniform light dispersion.

As a result of the arrangement, design, and selection of the reflector 32, lamp elements 30, and illumination lens 12, the present invention provides approximately a three-fold improvement over conventional devices; the illumination output being about 4 foot-candles compared to about 1.5 foot-candles after one (1) minute of operation.

Referring back to FIG. 4A, lamp elements 30 may be coupled to circuit board 40 using any suitable means, such as, for example, soldering. Some of the circuit components 42 used in the circuitry disposed in device 10 may also be disposed on circuit board 40. The cross-sectional view of device 10 also reveals that mounting tabs 14 are integrally formed end portions of strap assembly 48. Strap assembly 48 in fabricated from a conductive material such as steel, plated steel, anodized steel, or other such suitable materials. Ground terminal 50 is connected to strap assembly 48 and provides for the electrical connection of a ground wire. Thus, the strap assembly 48 is at ground potential when device 10 is installed and ground terminal 50 is properly connected to ground.

The light emitting electrical wiring device 10 of the present invention is substantially enclosed by illumination lens cover 12, rear housing member 52, and strap assembly 48. Strap assembly 48 conforms to an exterior surface of the rear housing member 52, forming a back cover sub-assembly. When lens cover 12 is pressed against the back cover sub-assembly, snap-in elements 54 engage strap assembly 48 and rear housing member 52 is captured between strap assembly 48 and lens cover 12.

In another embodiment, the mounting tabs 14 are formed from a non-conductive material and may be formed as an integral part of the rear housing member 52. In this embodiment, lens cover 12 and rear housing member 52 are configured to snap together. Accordingly, strap assembly 48 may be eliminated since it is no longer being relied upon to mate with lens cover 12.

Figure 4B:
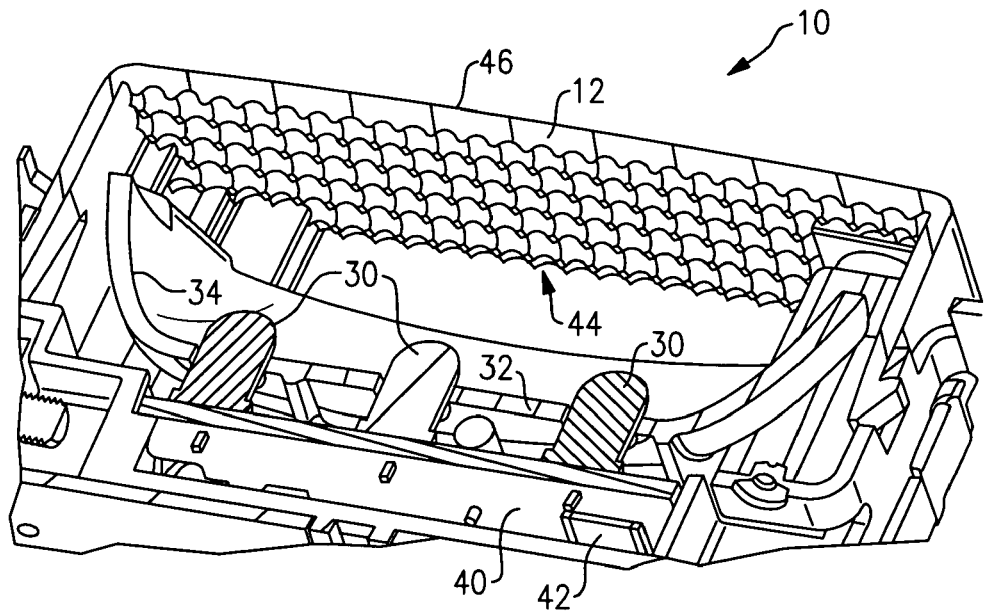
FIG. 4B is a cross-sectional perspective view of the light emitting wiring device shown in FIG. 1.

FIG. 4B is a cross-sectional perspective view of the light emitting wiring device 10 shown in FIG. 4A. FIG. 4A shows the cross-section of FIG. 4A rotated by a predetermined angular amount from axis "c". This view shows a three-dimensional view of the lens array disposed in rear surface 44 of lens cover 12. This view also illustrates that the various electrical components employed in device 10 may be coupled to either side of circuit board 40. As those of ordinary skill in the art will appreciate, electrical components may be provided in what are commonly referred to as through-hole configurations or as surface mount devices.

Figure 5:
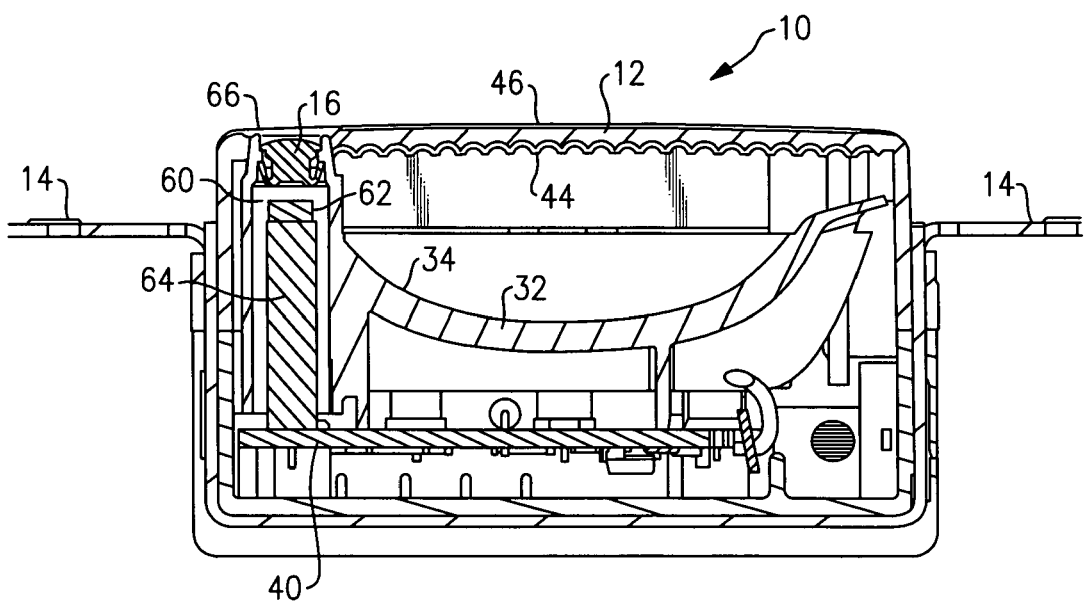
FIG. 5 is a transverse cross-sectional view of the light emitting wiring device shown in FIG. 1.

FIG. 5 is a transverse cross-sectional view of device 10 as shown in FIGS. 1-4. FIG. 5 provides a detailed view of sensor assembly 60. Sensor assembly 60 includes an elongated structure 66 that serves several functions. Elongated structure 66 serves to house ambient light sensor 62 in a hollow portion thereof. As noted previously, structure 66 may be formed as an integral portion of reflector element 32. Elongated structure 66 also serves as a means for mechanically coupling ambient light sensor 62 to circuit board 40. Accordingly, structure 66 serves to position sensor 62 as near as possible to the outer surface 46 of lens cover 12. At the same time, structure 66 forms a conduit for the electrical leads and connections between sensor 62 and circuit board 40. Elongated structure 66 includes a spacer element 64 disposed therein.

Spacer element 64 is employed to precisely position the ambient light sensor 62 within structure 66.

As noted above, elongated structure 66 is hollow and includes an isolation collar 68. Collar 68 forms an aperture that accommodates sensor lens 16. The position of elongated structure 66 and the aperture formed in collar 68 is precisely aligned with a corresponding through-hole portion 120 formed in lens cover 12. Sensor lens 16 is configured to conduct and focus incident ambient light onto the active portion of ambient light sensor 62.

Isolation collar 68 is also prevents any light emitted by lamps 30 from being directed toward sensor 62. Of course, the detection of any such emissions would provide light sensor circuitry with a false indication of the true ambient light levels and would improperly de-energize lamps 30.

In addition to isolation collar 68, the present invention uses several additional techniques to isolate sensor 62 from light emitted by lamps 30. As noted above, surface 34 may include a coated layer that reflects light from the lamps toward illumination lens 12. The coated layer serves a dual purpose of directing light toward the cover lens 12 and preventing the light generated by lamps 30 from penetrating the surface of elongated structure 66 and contaminating sensor 62.

Isolation may also be achieved by applying an opaque layer of material to the interior surface of structure 66. This interior layer of material also prevents light from contaminating sensor 62.

Another technique employed by the present invention to implement isolation between the lamps 30 and the sensor 62 relates to the implementation of sensor lens 16. As noted previously, light sensor lens 16 is implemented as a separate component relative to illumination lens 12. This implementation is significant because the refractive index interface between lens 12 and the interior region formed between lens 12 and reflector 32 would cause some of the incident light striking surface 44 to reflect back toward sensor 62. However, because the present invention separates lens 16 from lens 12, any incident light reflected from surface 44 will be directed toward collar 68 instead of toward sensor 62. On the other hand, only ambient light is directed into lens 16 toward sensor 62.

Lens 16 includes other light isolation features as well. As shown in FIG. 5, lens 16 is recessed relative to the outer surface 46 of lens cover 12. In another embodiment of the present invention, sensor lens 16 is recessed below inner surface 44 of the illumination lens cover 12. The isolation is further enhanced by collar 68 which is disposed between lens cover 12 and sensor lens 16. On the other hand, the use of collar 68 may allow sensor lens 16 to be eliminated from the design. The lens array 44 may be extended to cover the region above the ambient light sensor 62. One benefit to the latter approach relates to a more uniform outer surface 46. This may improve the aesthetic appearance of the device. Further, because the front cover 12 does not have an aperture disposed therein for sensor lens 16, device 10 may be more easily cleaned.

Those skilled in the art will understand that the aforementioned isolation methods may be used alone or in combination with one or more of the other isolation methods.

Figure 6:
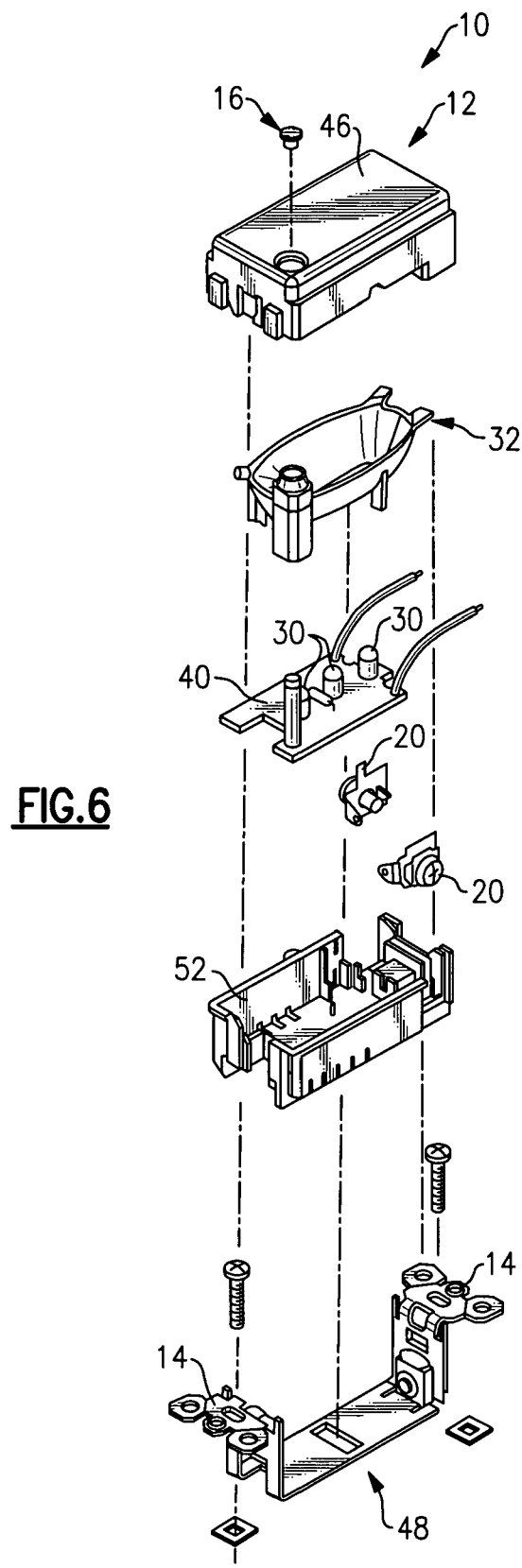
FIG. 6 is an exploded view of the light emitting wiring device shown in FIG. 1.

Referring to FIG. 6, an exploded view of the light emitting wiring device shown in FIG. 1 is provided. As noted above, strap assembly 48 is inserted into a corresponding portion of rear body member 52 to form a back cover for device 10. Printed circuit board 40 is disposed in the back cover portion and is electrically coupled to exterior connection terminals 20. Spacer 64 and sensor are shown as being connected to printed circuit board 40 in this view. Reflector element 32 and integrally formed elongated structure 66 are disposed over printed circuit board, with sensor 62 and spacer 64 being inserted inside elongated structure 66. Light sensor lens 16 is also inserted into the aperture formed by collar 68. Finally, lens cover 12 is disposed over the entire assembly such that snap elements 54 align with corresponding mating structures formed in strap assembly 48. After said alignment, lens cover 12 is pressed against the assembly and snap elements 54 engage the strap assembly 48 to complete the process.

Figure 7:
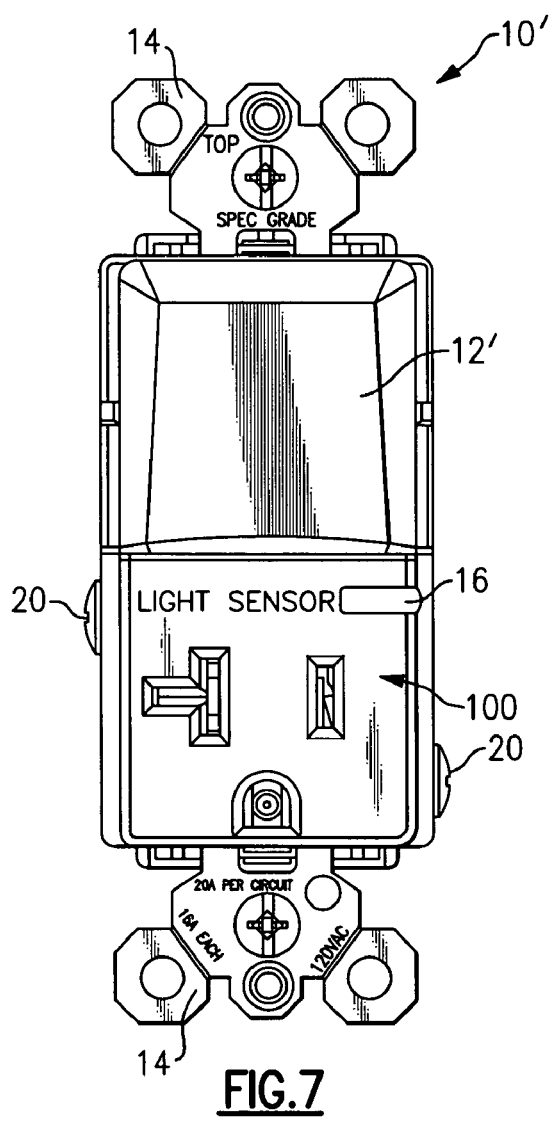
FIG. 7 is a front view of light emitting wiring device in accordance with a second embodiment of the present invention.

As embodied herein and depicted in FIG. 7, a front view of light emitting wiring device in accordance with a second embodiment of the present invention is shown. The light emitting device 10 of this embodiment provides a lens cover 12 that occupies only a portion of the user accessible surface of device 10. In this embodiment, the light emitting portion of device 10 may include one or two lamp elements 30 (not shown). The remaining portion of device 10 includes a wiring device 100. The wiring device may be a receptacle (as shown) or any suitable wiring device or devices, such as switches, protective devices such as transient voltage surge suppressors (TVSSs), surge protective devices (SPDs), ground fault circuit interrupters (GFCIs), arc fault circuit interrupters (AFCIs), power control devices such as light dimmers, proximity sensors, motor controls, or fan speed controls. Reference is made to U.S. patent application Ser. No. 10/998,369, filed Nov. 11, 2004 and titled Electrical Device With Circuit Protection Component and Light, which is incorporated herein by reference as though fully set forth in its entirety. Note that light sensor lens 16 is disposed in a portion of the wiring device 100. Those of ordinary skill in the art will understand that the sensor 62, and sensor lens 16, may be disposed in the surface area of cover lens 12 as disclosed previously.

Figure 8:
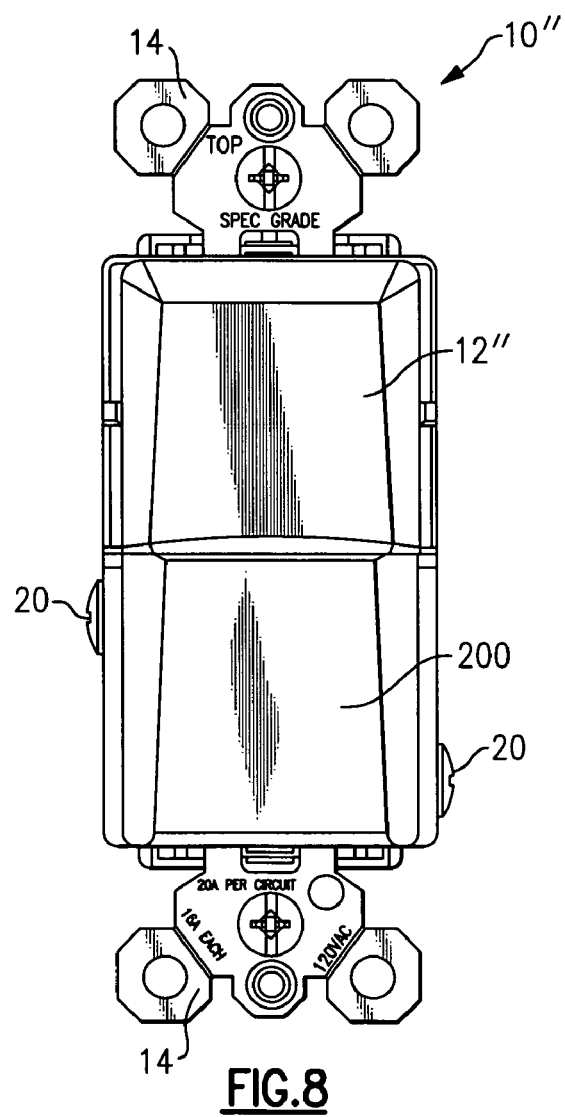
FIG. 8 is a front view of light emitting wiring device in accordance with a third embodiment of the present invention.

As embodied herein and depicted in FIG. 8, a front view of light emitting wiring device 10 in accordance with a third embodiment of the present invention is shown. This embodiment is similar to the one shown in FIG. 7 with the exception that a proximity detecting device 200 replaces and occupies the space previously occupied by wiring device 100 of FIG. 7. Proximity detecting device 200 is configured to detect a human presence within a predefined zone proximate the installed device 10. Proximity sensing device 200 is operatively coupled to the lamps 30 disposed behind illumination lens 12. The proximity detecting device 200 causes the lamps 30 to emit light when a human presence is detected.

In one embodiment of the present invention, the proximity detecting device 200 includes a motion detector that activates the lamp assembly in response to the movement of a person or object in the vicinity of device 10. This feature is energy efficient in that the lamp assembly is only activated when needed. The movement of a person or object may be detected by sensing step changes in ambient luminosity. A step decrease in luminosity may indicate that a person or object is entering the vicinity of the hallway light device and preventing the ambient light from reaching the light sensor. The light sensor reacts by actuating the lamp assembly in device 10. Once the person leaves the area, the light sensor experiences a step increase in luminosity, and the lamp assembly in device 10 is deactivated.

In another embodiment of the present invention, the proximity detecting device 200 includes a proximity light source that emits either visible or non-visible light, such as infrared light. When a person or object enters into the path of the light, the light is reflected back to the ambient light sensor. The lamp assembly is energized to emit light if the reflected light exceeds a predetermined threshold. Once the reflected light decreases below the threshold level, the lamp assembly is de-energized. The proximity light source/sensor may de-energize the lamp assembly if the amount of reflected light is less than a predetermined threshold or if there a predetermined rate of reduction in the amount of reflected light such that the lamp emits light only when there is a human need.

As previously discussed, the proximity detector is relatively energy efficient. Another reason for employing a proximity detector is to prevent false turn-off conditions from occurring when the lamp assembly is energized in response to darkened ambient lighting conditions. A false turn-off condition refers to instantaneous variations in the ambient light level that occur when a person or object approaches the light emitting wiring device and light emitted from a relatively remote source is reflected off of the individual into the ambient light sensor such that the incident light is greater than the sensor threshold even though the ambient conditions have not changed. Under these conditions the ambient light detector responds by turning the lamp assembly OFF. Once the reflection ceases, the light is reenergized. Under certain traffic conditions device 10 may cycle between the ON and OFF state in accordance with the reflected pattern. The so-called false turn-off condition may be avoided by employing a proximity detector. The proximity detector is configured to override the ambient light detector if the ambient light detector is in the act of detecting a darkened ambient condition. As a result, the lamp(s) continue to emit light even though a person or object has entered into close proximity to the device.

It will be apparent to those of ordinary skill in the pertinent art that modifications and variations can be made to proximity detector 200 of the present invention depending on the nature of the sensor. In addition to infrared devices and motion detectors, the proximity sensor of the present invention may be implemented using any suitable means such as a thermal sensor configured to detect heat generated by a human body, or an acoustic sensor. The acoustic sensor may be also configured to detect step changes in reflected sounds generated from a transducer disposed in the device. Detector 200 may include both a thermal detector and an acoustic detector. The two detectors are coordinated so as to even detect a relatively stationary human presence and a human presence behind a wall or barrier.

Figure 9:
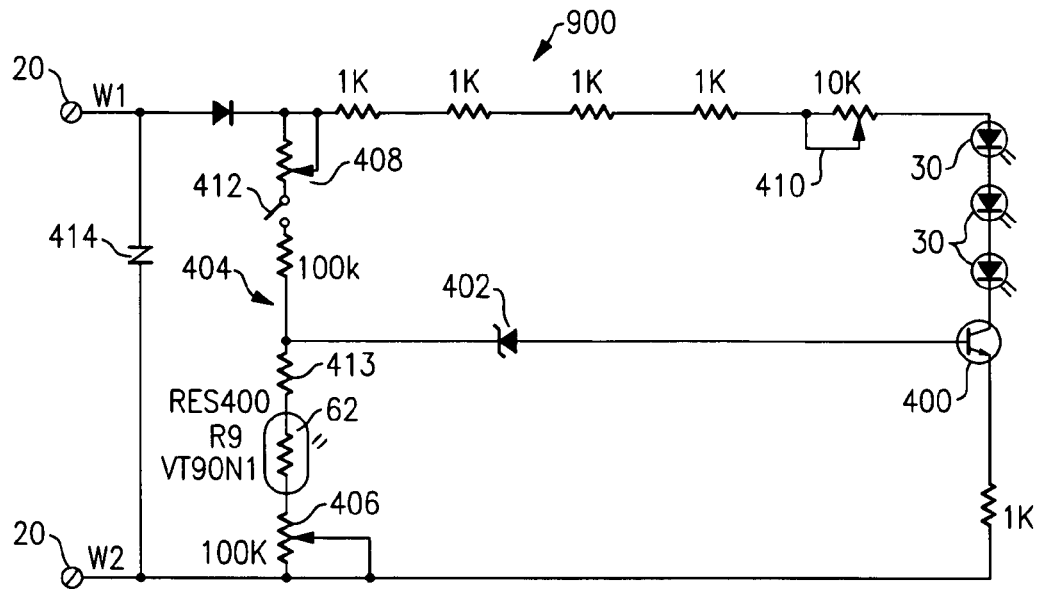
FIG. 9 is a schematic diagram of the light emitting wiring device in accordance with the present invention.

As embodied herein and depicted in FIG. 9, a schematic diagram of a circuit 900 disposed in light emitting wiring device 10 is shown. As is known in the art, device 10 is installed by connecting wiring terminals 20 to a source of voltage. A surge suppression device or spark gap may be employed to protect circuit 900. By way of a non-limiting example, circuit 900 includes movistor 414 disposed across terminals 20. Lamps 30 are turned ON and OFF by control transistor 400. Control transistor 400 is turned ON when the voltage to zener diode 402 is greater than the rated zener voltage. Zener diode 402 is governed by voltage divider 404. Voltage divider 404 is powered by the source voltage provided by terminals 20. The ambient light sensor 62 is disposed in one of the legs of the voltage divider.

As those of ordinary skill in the art will appreciate, the resistance of the ambient light sensor 62 varies with the incident ambient light. Accordingly, the voltage provided by divider 404 to zener diode 402 varies in accordance with the incident ambient light. When the ambient light levels are relatively low, the voltage applied to zener diode 402 is greater than the zener voltage, control transistor 400 is turned ON, and lamps 30 are energized. On the other hand, when the ambient light level is relatively high, the resistance of sensor 62 causes the voltage that is applied to zener diode 402 to be less than the zener voltage. Accordingly, control transistor 400 is turned OFF and the lamps 30 are deenergized.

When the source voltage is AC, the circuit of FIG. 9 provides an emitted light pattern that is inversely proportional to the ambient light such that device 10 emits more light when the ambient light levels are lower and less light when the ambient light level is relatively higher. As noted above, the applied voltage to zener diode 402 is a function of the resistance of ambient light sensor 62. Since the voltage divider 404 is coupled to the source voltage, the voltage to zener 402 is additionally dependent on the instantaneous value of the source voltage. For example, when the ambient light level is relatively high, the instantaneous AC voltage is greater than the zener voltage only when it approaches 90 degrees in the cycle. Accordingly, lamps 30 are on only for a brief duration of each AC line cycle. When the ambient light levels are very low, i.e., in a completely darkened room, the resistance of ambient light sensor 62 is such that the voltage applied to the zener diode 402 is greater than the zener voltage from about 0 to 180 degrees. Thus, lamps 30 are energized during that portion of the AC cycle from approximately 0 degrees to 180 degrees. Thus, there is an inverse relationship between the duty cycle and the ambient light level.

In an alternate embodiment of the present invention, voltage divider 404 receives voltage from a pure DC source. Since the lamps 30 are no longer illuminated by way of a variable AC duty cycle, they are either ON or OFF on the basis of the value of the variable resistance of light sensor 62. Accordingly, lamps 30 are energized when the variable sensor resistance, in conjunction with voltage divider 404, provides a voltage in excess of the zener voltage of diode 402.

Since room spaces vary in size, object arrangement, color, and usage, the desired illumination of light emitting wiring device 10 may vary. Accordingly, users may desire a light emitting device 10 that features a user selectable ambient light threshold that corresponds to the illuminated space. Accordingly, circuit 900 includes a lamp illumination level control mechanism as embodied by potentiometer 406, potentiometer 408, or potentiometer 410. The potentiometers may be disposed in the voltage divider and are configured to selectively vary the voltage divider output. In one embodiment, the potentiometers are disposed inside the device 10 enclosure and are only adjustable at the factory. As such, device 10 will have a predetermined illumination rating that is not adjustable after leaving the factory. The commercial outlet that carries device 10 may sell various devices having differing illumination levels preset at the factory. In an alternate embodiment of the present invention the potentiometers are user accessible, and hence, user adjustable. As those of ordinary skill in the art will appreciate, the user accessible potentiometers may be adjusted using any suitable means. For example, the variable resistance may be adjusted using tools such as screwdrivers, or by way of a control lever or dial.

Device 10 may also include switch 412. Switch 412 provides the device with ON/OFF functionality. When switch 412 is in the ON position, lamp 30 emission is controlled by the light sensor 62. When switch 412 is turned OFF, lamps 30 are deenergized irrespective of ambient light conditions. Switch 412 may be coupled to a user accessible potentiometer. In an alternate embodiment of the present invention, circuit 900 may include ON/OFF switch 412 without including an ambient light detection function.

It will be apparent to those of ordinary skill in the pertinent art that modifications and variations can be made to the ambient light sensor 62 of the present invention. For example, a cadmium-sulfide photo-cell may be employed herein. Other types of light sensors are equally applicable to the invention such as photo-diodes or photo-transistors that generate an electrical current in response to the amount of ambient light.

Since the light sensitivity of light sensors may vary from device to device during their manufacture, a factory adjustable trimming element such as resistor 413 may be included in the hallway light device to compensate for the variation.

It will also be apparent to those of ordinary skill in the pertinent art that modifications to circuit 900 can be made that generate a non-linear relationship between light output and the detected level of ambient light.

Figure 10:
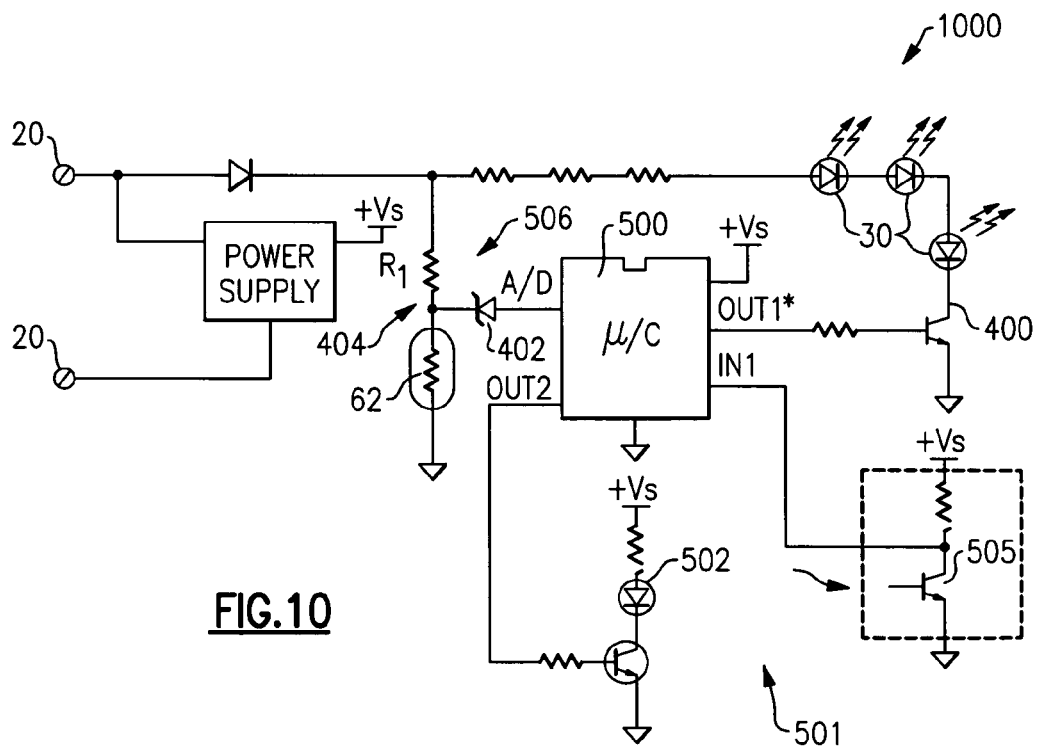
FIG. 10 is a schematic diagram of the light emitting wiring device in accordance with another embodiment of the present invention.

Referring to FIG. 10, a circuit schematic diagram in accordance with another embodiment of the present invention is shown. FIG. 10 includes a circuit 1000 that features a false turn-off rejection circuit. The circumstances causing false turn-off were described above in the discussion of the proximity detector. Circuit 1000 includes processor 500 disposed between ambient light sensor 62 and control transistor 400. Proximity sensor 501 is coupled to processor 500. Proximity sensor 501 includes an infrared transmitter 502 and an infrared detector 505. When an object passes device 10, the infrared light emitted from infrared transmitter 502 is reflected to receiver 505. Receiver provides processor 500 with a detection signal. Processor 500 responds by generating an "object present" signal that overrides the ambient light detector signal and turns transistor 4000N. Accordingly, lamps 30 are energized when an object is deemed to be in the field of view of proximity sensor 501 irrespective of the ambient light level detected by ambient light sensor 62.

In another embodiment of the present invention, the false turn-off feature is implemented by a clock that is triggered by the ambient light detector 506 when it detects a step increase in light that is greater than a predetermined threshold. The step increase in light intensity may be caused by a light in the room being turned ON or by an object passing in front of the device 10. Accordingly, processor 500 checks the state of the ambient light detector after a predetermined time delay, i.e., ten minutes, has elapsed. If the ambient light level exceeds the predetermined threshold after the time period has elapsed, processor 500 is programmed to determine that the step increase in light is due to a light in the room being turned ON. In response thereto, processor 500 turns lamps 30 OFF by providing an appropriate signal to the input of transistor 400 because it deems the additional light provided by device 10 to be unnecessary. On the other hand, if the ambient light level does not exceed the predetermined threshold level after the delay period elapses, processor 500 is programmed to determine that the step increase is from an object. Accordingly, processor 500 ensures that lamps 30 remain energized.

In another embodiment, processor 500 polls the ambient light detector during the predetermined time delay. If the detected ambient light levels are below the threshold, the time delay may be re-initialized or extended. This approach prevents multiple passes through the reflective region of the proximity detector from causing a false turn-off.

Figure 11:
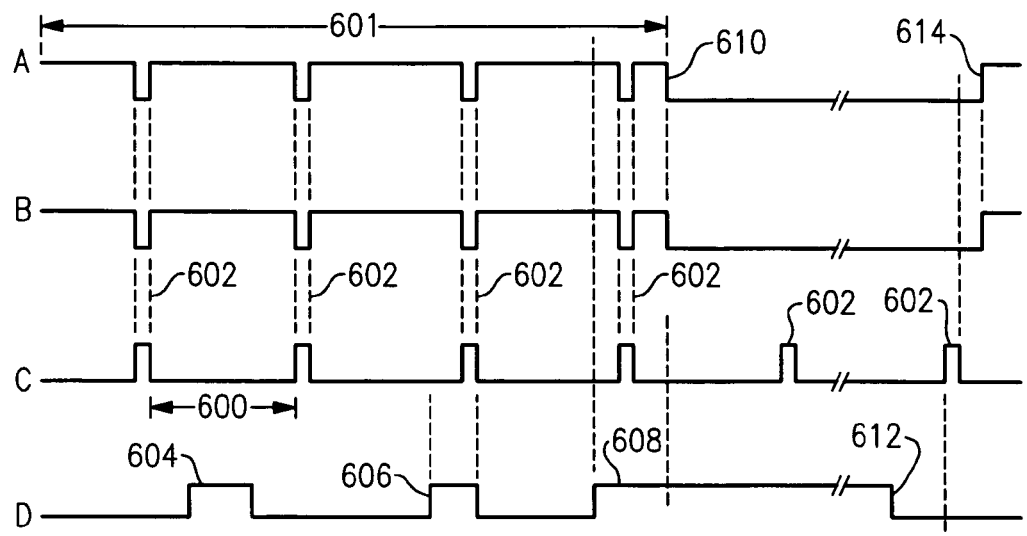
FIGS. 11A-D are timing diagrams illustrating the operation of a light emitting wiring device having false turn-off avoidance capabilities.

FIGS. 11A-D provide timing diagrams illustrating the operation of an embodiment of the false turn-off circuitry. FIG. 11A represents the ON/OFF state of lamps 30. FIG. 11B represents the control signal from processor 500 to transistor 400. FIG. 11C represents the periodic delay signal 600 generated by processor 500. FIG. 11D illustrates output signals from the ambient light detector 506 in response to a signal from ambient light sensor 62.

In FIG. 11A, lamps 30 are ON during interval 601 in response to a darkened ambient lighting condition. Lamps 30 are ON or OFF in response to a signal from control transistor 400 as illustrated in FIG. 11B. The predetermined periodic time delay 600 is illustrated by FIG. 11C. When periodic time delay 600 elapses, processor 500 turns transistor 400 OFF for a predetermined time interval 602. Lamps 30 turn OFF for approximately the same time interval 602. The absences of light during intervals 602 are too brief to be noticeable. In addition, processor 500 interrogates detector 506 however only during time intervals 602 when lamps 30 are not ON.

FIG. 11D depicts occasions when a person or nearby object is close to the wiring device. Occasion 604 is not coincident with an interval 602. Since ambient light detector 506 is not being interrogated during occasion 604, lamps 30 remain ON. On the other hand, occasion 606 is coincident with an interval 602. Even though ambient light detector 506 is being interrogated, lamps 30 are OFF when the interrogation is taking place. This avoids the possibility of any reflected light off of the person or object that would otherwise cause false-turn off. An occasion 608 when a light is turned ON in the room is also depicted. Of course, the light is detected by detector 506 during a subsequent interval 602. In turn, processor 500 turns lamps 30 OFF at time 610. Lamps 30 turn on again when a darkened ambient condition returns at time 612. The darkened ambient condition is recognized by processor 500 during a subsequent interval 602. In response, processor 500 turns lamps 300N at time 614.

Stated generally, false turn-off of lamps 30 is avoided by periodically interrogating the status of the ambient light detector. Of course, the ambient light detector must be interrogated when lamps 30 are OFF, otherwise lamps 30 would never turn on. The interrogation rate when the lamps 30 are OFF is at the same periodic interrogation rate as when lamps 30 are ON. In another embodiment, the interrogation rate when lamps 30 are OFF is different in comparison to when lamps 30 are ON. The ambient light detector may even be continuously interrogated when lamps 30 are OFF. Advantageously, lamps 30 would then turn ON immediately in response to a darkened room ambient as opposed to having to wait for the next interrogation interval before turning ON.

Figure 12:
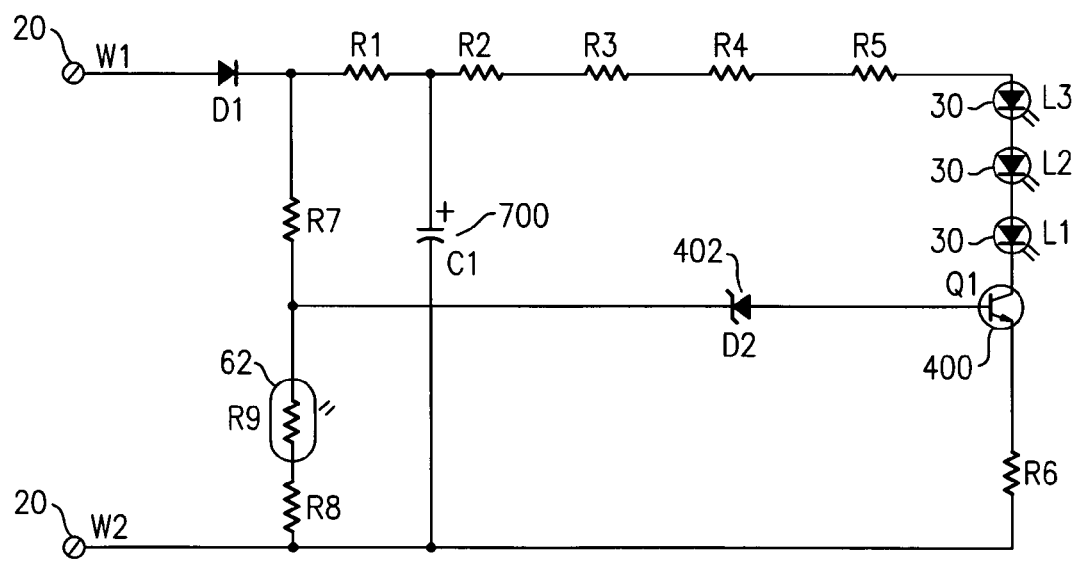
FIG. 12 is a schematic diagram of the light emitting wiring device in accordance with yet another embodiment of the present invention.

As embodied herein and depicted in FIG. 12, a schematic of a lighting circuit 1200 in accordance with an alternate embodiment of the present invention is disclosed. Circuit 1200 includes an emergency lighting feature embodied by capacitor 700. Capacitor 700 provides power to lamps 30 when there is a loss of source voltage. Circuit 1200 enables wiring device 10 to emit light into a darkened space even when device 10 experiences a loss of external power. Capacitor 700 may provide enough power to energize lamps 30 during a loss of source voltage for a period of at least about ten minutes. Of course, the embodiment of FIG. 12 may also include the other features and benefits that have been previously described such as proximity sensing capability, ambient light sensing capability, and/or false turn-off rejection. Circuit 1200 may also be adapted to the embodiments depicted in FIG. 7 and FIG. 8, i.e., include a wiring device in addition to the light emitting portion.

Figure 13:
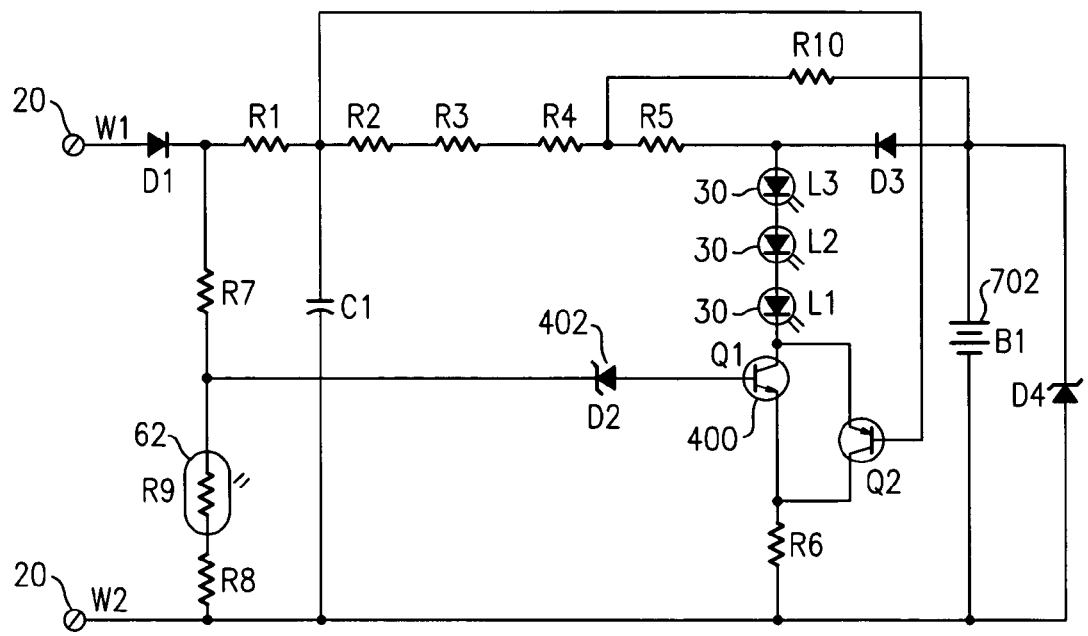
FIG. 13 is a schematic diagram of the light emitting wiring device in accordance with yet another embodiment of the present invention.

Referring to FIG. 13, an alternate embodiment of the emergency lighting circuit is disclosed. Circuit 1300 replaces the capacitor employed in FIG. 12 with battery 702. In both emergency lighting embodiments, the emergency lighting allows the ambient light sensor to operate in the event of a power loss. In other words, lamps 30 are energized when ambient light levels are relatively low, whether power is provided by some external source, or by way of capacitor 700 or battery 702.

Figure 14:
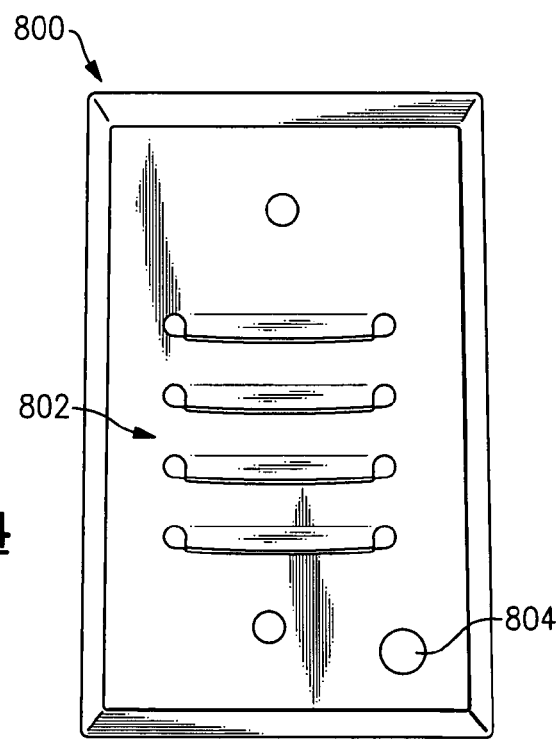
FIG. 14 is a front view of a cover plate usable with the present invention.

Referring to FIG. 14A, a front view of a louvered cover plate 800 in accordance with an embodiment of the present invention is shown. The cover plate 800 is typically mounted to the hallway light device as the final installation step. Cover plate 800 includes a shrouding structure 802 which directs, concentrates or restricts the light emitted from lamps 30. Plate 800 also includes a window 804 that accommodates the ambient light sensor. Plate 800 may also include a window for the proximity sensor as well and/or proximity sensor. Window 804 is also advantageous in that it prevents the extraneous light that contributes to false turn-off from reaching the ambient light sensor. Window 804 may be implemented as merely an aperture in plate 800 or it may be implemented as a lens disposed in an aperture.

FIG. 14B is another example of a wall plate 810 suitable for use with the present invention. Plate 810 includes four lateral portions 814 that frame opening 812. As those skilled in the art will appreciate, the dimensions of cover plate 810 may conform to the cover plate depicted in the ANSI/NEMA WD6 standard such that the entire available surface area of cover lens 12 (See FIG. 1 as an example) is disposed within opening 812. Wall plate 800 (FIG. 14A) and wall plate 810 (FIG. 14B) are interchangeable.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A light emitting wiring device for selectively illuminating a space, the device comprising:
    a housing including a plurality of wiring terminals configured to be connected to a source of electrical power;
    at least one circuit disposed in the housing, the at least one circuit being configured to provide an output signal in response to at least one external input signal; and
    an emission-detection assembly including,
        a lamp sub-assembly coupled to the at least one circuit, the lamp sub-assembly including reflective portion and a reflective portion and at least one light emitting element configured to emit light in response to the output signal, and
        an ambient light sensor sub-assembly including a housing portion integrally formed in the reflective portion including a housing portion integrally formed in the reflective portion coupled to the at least one circuit and including an ambient light sensor and a sensor housing assembly, the ambient light sensor being configured to generate the at least one external input signal in response to an ambient light level in the space, the sensor housing assembly being configured to substantially isolate the ambient light sensor from the light emitted into the space.

2. The device of claim 1, further comprising a lens cover coupled to the housing and configured to direct the light emitted by the at least one light emitting element into the space.

3. The device of claim 2, wherein the lens cover has a major surface shape and size corresponding to a shape and size of a standard wall plate opening.

4. The device of claim 3, wherein the standard wall plate includes dimensional characteristics conforming to an ANSI/NEMA WD6 standard.

5. The device of claim 2, wherein the lens cover includes at least one attachment device configured to mate with the housing.

6. The device of claim 2, wherein the lens cover is configured to diffuse the light emitted by the at least one light emitting element.

7. The device of claim 2, wherein the lens cover includes a plurality of convex lens elements.

8. The device of claim 2, wherein the lens cover includes a plurality of parabolic lens elements.

9. The device of claim 2, wherein the lens cover includes a plurality of non-parabolic complex lens elements.

10. The device of claim 2, wherein the lens cover includes a plurality of pyramidal lens elements.

11. The device of claim 2, wherein the lens cover includes a plurality of polygonal lens elements.

12. The device of claim 2, wherein the lens cover includes a fresnel lens array.

13. The device of claim 2, wherein the lens cover includes a lenticular lens array.

14. The device of claim 2, wherein the lens cover includes a minimum of eighty-one (81) lenslets per square inch.

15. The device of claim 2, wherein the lens cover is configured to conduct light from the space to the ambient light sensor.

16. The device of claim 1, wherein the housing includes a plurality of vents disposed therein.

17. The device of claim 1, wherein the lamp sub-assembly further comprises:
a base member configured to accommodate the at least one light emitting element; and
a reflective hood connected to the base member and configured to reflect the light emitted by the at least one light emitting element.

18. The device of claim 17, wherein the ambient light sensor sub-assembly further comprises an elongated structure integrally formed in the reflective hood, the elongated structure extending from a position proximate the base member to a sensor position proximate the lens cover, the elongated structure including the ambient light sensor disposed at the sensor position.

19. The device of claim 18, wherein the elongated structure is opaque such that neither the light emitted by the at least one light emitting element nor the light reflected by the reflective hood is incident the ambient light sensor.

20. The device of claim 17, wherein the reflective hood includes a reflective metal surface.

21. The device of claim 17, wherein the reflective hood is fabricated from a non-conductive material and further comprises a reflective layer deposited thereon.

22. The device of claim 21, wherein the reflective layer and the reflective hood are configured such that neither the light emitted by the at least one light emitting element nor the light reflected by the reflective hood is incident the ambient light sensor.

23. The device of claim 1, wherein the ambient light sensor sub-assembly further comprises:
an elongated structure integrally formed in the lamp sub-assembly, the elongated structure extending from a position proximate the base member to a collar portion extending from the lamp sub-assembly, the collar portion being opaque such that neither the light emitted by the at least one light emitting element nor light reflected by the lamp sub-assembly is incident the ambient light sensor;
a spacer element disposed within the elongated structure, the spacer element being configured to position the ambient light sensor in an aperture in the collar portion; and
a sensor lens element configured to direct the ambient light from the space into the ambient light sensor.

24. The device of claim 23, further comprising a lens cover coupled to the housing and enclosing the lamp sub-assembly therein, the lens cover including an aperture corresponding to the collar aperture, the sensor lens element being disposed in the collar aperture.

25. The device of claim 23, further comprising a lens cover coupled to the housing and enclosing the lamp sub-assembly therein, the lens cover including the sensor lens element integrally formed therein, the sensor lens element being aligned to the collar aperture.

26. The device of claim 1, wherein the at least one circuit includes an ambient light sensor circuit coupled to the ambient light sensor, the ambient light sensor circuit includes at least one threshold detector coupled to the ambient light sensor and configured to generate a threshold detection signal when the ambient light level falls below a predetermined threshold.

27. The device of claim 26, wherein the at least one threshold detector comprises:
a voltage divider coupled to the ambient light sensor, the voltage divider being configured to generate a control voltage that is a function of an impedance of the ambient light sensor; and
a zener diode coupled to the voltage divider and responsive to the control voltage.

28. The device of claim 26, wherein the ambient light sensor circuit generates the output signal such that an intensity of the light emitted by the light emitting elements is inversely related to the ambient light level.

29. The device of claim 26, wherein the at least one circuit includes a proximity detector circuit configured to generate the output signal in response to an object being disposed within the space.

30. The device of claim 29, wherein the proximity detector includes an infrared light source and an infrared light detector.

31. The device of claim 29, wherein the proximity detector includes a motion detector.

32. The device of claim 26, wherein the at least one circuit includes a false turn-off rejection circuit configured to ignore pre-determined instantaneous variations in the ambient light level.

33. The device of claim 26, wherein the at least one circuit includes a false turn-off rejection circuit that comprises:
a proximity detector circuit configured to detect object presence within the space and provide an object present signal in response thereto;
a processor coupled to the proximity sensor and the ambient light sensor, the processor being programmed to generate the output signal in response to a predetermined pattern in the object present signal and the threshold detection signal.

34. The device of claim 33, wherein the processor is configured to poll the ambient light threshold detector at predetermined intervals.

35. The device of claim 26, wherein the at least one circuit includes a false turn-off rejection circuit that includes a processor configured to periodically turn off the at least one light emitting element and to poll the status of the ambient light detector when the at least one light emitting element is turned off.

36. The device of claim 1, further comprising an intensity selection mechanism coupled to the lamp sub-assembly.

37. The device of claim 36 wherein the intensity selection mechanism is user accessible.

38. The device of claim 1, further comprising an ON/OFF switch coupled to the lamp sub-assembly.

39. The device of claim 38, wherein the ON/OFF switch is user accessible.

40. The device of claim 1, further comprising an energy storage device configured to provide power to the device in the event that the source of electrical power is disabled.

41. The device of claim 40, wherein the energy storage device includes a battery.

42. The device of claim 40, wherein the energy storage device includes a capacitor.

43. The device of claim 1, wherein a device illumination output is approximately four (4) foot-candles after one minute of operation.

44. The device of claim 1, further comprising an electrical device assembly disposed in the housing substantially adjacent to the emission-detection assembly.

45. The device of claim 44, wherein the electrical device assembly is selected from a group of electrical device assemblies including an outlet receptacle, a switch device, a TVSS, an SPD, a GFCI, an AFCI, a light dimmer, a proximity sensor, a motor control device, or a fan speed control device.

46. The device of claim 1, wherein the emission-detection assembly includes an integral housing that includes a light emitting element portion configured to accommodate the at least one light emitting element, and the ambient light sensor housing.

47. The device of claim 1, further comprising a selectable tab element that configures the at least one circuit for operation at a predetermined voltage selectable from a plurality of voltages provided by the source of electrical power.

48. The device of claim 1, wherein the housing is configured to accommodate a cover plate that shields the lens cover such that light generated by the at least one light emitting element is selectively emitted into the space.

49. The device of claim 48, wherein the shield includes a louvered structure.

50. The device of claim 49, wherein the cover plate includes an aperture configured to permit the ambient light sensor to sense an ambient light condition.

51. The device of claim 1, wherein the at least one light emitting element includes a light emitting diode.

52. A light emitting wiring device for selectively illuminating a space, the device comprising:

a housing including a plurality of wiring terminals configured to be connected to a source of electrical power;

at least one circuit disposed in the housing, the at least one circuit being configured to provide an output signal in response to at least one external input signal;

an emission-detection assembly including, a lamp sub-assembly coupled to the at least one circuit, the lamp sub-assembly including at least one light emitting element configured to emit light in response to the output signal, an ambient light sensor sub-assembly coupled to the at least one circuit and including an ambient light sensor and a sensor housing assembly, the ambient light sensor being configured to generate the at least one external input signal in response to an ambient light level in the space, the sensor housing assembly being configured to substantially isolate the ambient light sensor from the light emitted into the space; and a lens cover coupled to the housing, the lens cover including a major surface shape and size corresponding to a shape and size of a standard wall plate opening, the major surface including a lens array disposed therein, the ambient light sensor sub-assembly being disposed within a region formed by the lens cover, the ambient light sensor sub-assembly being disposed within a region formed by the lens cover, the lens array being configured to direct the light emitted by the at least one light emitting element into the space.

* * * * *

UNITED STATES PATENT AND TRADEMARK OFFICE
CERTIFICATE OF CORRECTION

| | | |
|---|---|---|
| PATENT NO. | : 7,758,234 B1 | Page 1 of 1 |
| APPLICATION NO. | : 11/294167 | |
| DATED | : July 20, 2010 | |
| INVENTOR(S) | : Gerald R. Savicki, Jr. et al. | |

It is certified that error appears in the above-identified patent and that said Letters Patent is hereby corrected as shown below:

Column 14, claim 1, line 35, reads "reflective portion and a reflective portion and" Please keep the first -- reflective portion and -- and delete the second "a reflective portion and"

The sentence should therefore read:

including reflective portion and at least one light emitting element...

Column 14, claim 1, line 41 and 42, please delete "including a housing portion integrally formed in the reflective portion"

Column 18, claim 52, line 30, 31, and 32, please delete "the ambient light sensor sub-assembly being disposed within a region formed by the lens cover"

Signed and Sealed this

Fifteenth Day of February, 2011

David J. Kappos
*Director of the United States Patent and Trademark Office*